(12) United States Patent
Stakheev et al.

(10) Patent No.: US 9,168,517 B2
(45) Date of Patent: Oct. 27, 2015

(54) CATALYST COMPOSITION AND METHOD FOR USE IN SELECTIVE CATALYTIC REDUCTION OF NITROGEN OXIDES

(75) Inventors: Alexandr Yu Stakheev, Moscow (RU); Marie Grill, Frederiksberg (DK); Arkady Kustov, Frederiksberg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/353,620

(22) PCT Filed: May 2, 2012

(86) PCT No.: PCT/EP2012/058003
§ 371 (c)(1),
(2), (4) Date: May 13, 2014

(87) PCT Pub. No.: WO2013/060487
PCT Pub. Date: May 2, 2013

(65) Prior Publication Data
US 2014/0294706 A1    Oct. 2, 2014

(30) Foreign Application Priority Data
Oct. 24, 2011    (WO) ................. PCT/EP2011/005344

(51) Int. Cl.
*B01J 29/00*    (2006.01)
*B01D 53/94*    (2006.01)
(Continued)

(52) U.S. Cl.
CPC .............. *B01J 29/88* (2013.01); *B01D 53/944* (2013.01); *B01D 53/9418* (2013.01); *B01J 23/72* (2013.01); *B01J 29/085* (2013.01); *B01J 29/14* (2013.01); *B01J 29/16* (2013.01); *B01J 29/185* (2013.01); *B01J 29/24* (2013.01); *B01J 29/26* (2013.01); *B01J 29/405* (2013.01); *B01J 29/46* (2013.01); *B01J 29/48* (2013.01); *B01J 29/655* (2013.01); *B01J 29/68* (2013.01); *B01J 29/69* (2013.01); *B01J 29/70* (2013.01); *B01J 29/7007* (2013.01); *B01J 29/7049* (2013.01); *B01J 29/7057* (2013.01); *B01J 29/7065* (2013.01); *B01J 29/72* (2013.01); *B01J 29/723* (2013.01); *B01J 29/7215* (2013.01); *B01J 29/763* (2013.01); *B01J 29/7615* (2013.01); *B01J 29/783* (2013.01); *B01J 29/7815* (2013.01); *B01J 35/04* (2013.01); *B01J 37/0215* (2013.01); *B01J 37/0244* (2013.01); *B01D 2251/2062* (2013.01);
(Continued)

(58) Field of Classification Search
CPC ........ B01J 29/00; B01J 29/76; B01J 29/7057; B01D 2255/502; B01D 2255/908; B01D 53/9445
See application file for complete search history.

(56) References Cited

U.S. PATENT DOCUMENTS 5,681,788 A * 10/1997 Kanesaka et al. ............... 502/65
8,425,869 B2 * 4/2013 Sato et al. ..................... 423/235
(Continued)

FOREIGN PATENT DOCUMENTS

CN    101443116    5/2009
CN    101722059    6/2010
(Continued)

*Primary Examiner* — Timothy Vanoy
(74) *Attorney, Agent, or Firm* — Dickstein Shapiro LLP

(57) ABSTRACT

Catalyst composition for selective reduction of nitrogen oxides and soot oxidation comprising a physical mixture of one or more acidic zeolite or zeotype components with one ore more redox active metal compounds and a method for selective reduction of nitrogen oxides and soot oxidation by use of the catalyst composition.

16 Claims, 4 Drawing Sheets

(51) Int. Cl.

| | |
|---|---|
| *B01J 29/88* | (2006.01) |
| *B01J 29/46* | (2006.01) |
| *B01J 29/76* | (2006.01) |
| *B01J 29/70* | (2006.01) |
| *B01J 29/68* | (2006.01) |
| *B01J 23/72* | (2006.01) |
| *B01J 37/02* | (2006.01) |
| *B01J 29/08* | (2006.01) |
| *B01J 29/14* | (2006.01) |
| *B01J 29/16* | (2006.01) |
| *B01J 29/18* | (2006.01) |
| *B01J 29/24* | (2006.01) |
| *B01J 29/26* | (2006.01) |
| *B01J 29/40* | (2006.01) |
| *B01J 29/48* | (2006.01) |
| *B01J 29/65* | (2006.01) |
| *B01J 29/69* | (2006.01) |
| *B01J 29/72* | (2006.01) |
| *B01J 29/78* | (2006.01) |
| *B01J 35/04* | (2006.01) |

(52) U.S. Cl.
CPC . *B01D 2255/2065* (2013.01); *B01D 2255/2073* (2013.01); *B01D 2255/2092* (2013.01); *B01D 2255/20738* (2013.01); *B01D 2255/20761* (2013.01); *B01D 2255/407* (2013.01); *B01D 2255/502* (2013.01)

(56) References Cited

U.S. PATENT DOCUMENTS

| | | |
|---|---|---|
| 8,551,901 B2 * | 10/2013 | Shinoda ................... 502/73 |
| 2003/0092567 A1 * | 5/2003 | Tanaka et al. ............. 502/302 |
| 2009/0304566 A1 | 12/2009 | Golden et al. |
| 2012/0191288 A1 * | 7/2012 | Qi et al. ..................... 701/29.1 |
| 2013/0089483 A1 * | 4/2013 | Stiebels et al. ............ 423/239.2 |
| 2013/0202524 A1 * | 8/2013 | Maurer et al. .............. 423/709 |

FOREIGN PATENT DOCUMENTS

| | | | |
|---|---|---|---|
| EP | 2 123 355 A1 | 11/2009 | |
| WO | WO 9956859 A1 * | 11/1999 | ............ B01D 53/94 |
| WO | WO 2008/085280 A2 | 7/2008 | |

* cited by examiner

CATALYST COMPOSITION AND METHOD FOR USE IN SELECTIVE CATALYTIC REDUCTION OF NITROGEN OXIDES

CROSS-REFERENCE TO RELATED APPLICATIONS

This application is a national stage application and claims priority from PCT/EP2012/058003 filed May 2, 2012, which in turn claims priority from PCT/EP2011/005344 filed Oct. 24, 2011.

The present invention relates to catalyst composition for use in selective reduction of nitrogen oxides in off-gases by reaction with ammonia or a precursor thereof.

Catalysts for $NH_3$—SCR, i.e. selective reduction of nitrogen oxides (NOx) by use of ammonia as reductant are well known in the art. Those catalysts include zeolitic material, optionally promoted with copper or iron The problem to be solved by this invention is to provide a catalyst composition and method for the reduction of nitrogen oxides with a $DeNO_x$ activity at reaction temperatures between 150 and 550° C.

Off-gases from lean combustion engines contain in addition to NOx, hydrocarbons, CO and soot particles which can be reduced or removed by catalytic oxidation. Consequently, the catalyst composition and method of this invention shall further include soot and hydrocarbon oxidation activity simultaneously with the DeNOx activity.

Figure 1:
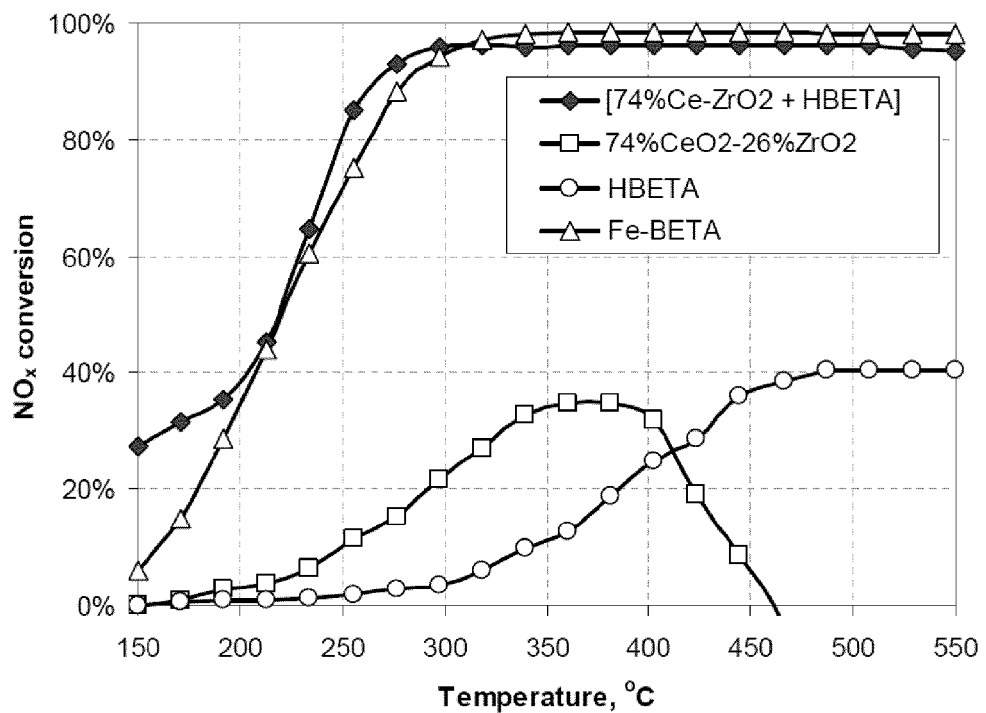
FIG. 1 is a graph illustrating increased $DeNO_x$ activity of $CeO_2$—$ZrO_2$+H-Beta zeolite composite catalyst relative to individual $CeO_2$—$ZrO_2$ and H-Beta zeolites.

Our recent studies revealed several examples of a pronounced synergistic effect in composite catalysts prepared by mechanical mixing of acidic zeolite or zeotype powder and redox active metal compounds.

We have found that catalyst composition comprising a one or more acidic zeolite or zeotype components physically admixed with one ore more redox active metal compounds shown an improved activity in the selective reduction of nitrogen oxides and oxidation of hydrocarbons, CO and soot contained in off-gas.

The term "redox active metal compounds" as used herein relates to metal compounds which reversibly can be oxidized and reduced in terms of changes in oxidation number, or oxidation state, of the metal atom or compound.

Pursuant to the above findings, the present invention provides a catalyst composition for selective reduction of nitrogen oxides and soot oxidation comprising one or more acidic zeolite or zeotype components selected from the group consisting of BEA, MFI, FAU, FER, CHA, MOR or mixtures thereof physically admixed with one ore more redox active metal compounds selected from the group consisting of $Cu/Al_2O_3$, $Mn/Al_2O_3$, $CeO_2$—$ZrO_2$, Ce—$Mn/Al_2O_3$ and mixtures thereof.

Catalyst compositions prepared by mechanical mixing of the above mentioned zeolites or zeotype materials and redox metal components mixing according to the invention exhibit a pronounced synergistic effect. $DeNO_x$ activity of such composite catalysts significantly exceeds activity of their individual components.

The acidic zeolite or zeotype component can be used in protonic form or promoted with Fe.

Preferably, the weight ratio between the zeolite components and the redox components is between 1:1 to 1:50

In an embodiment of the invention, the redox components are dispersed on a support selected from the group consisting of of $Al_2O_3$, $TiO_2$, $SiO_2$, $CeO_2$, $ZrO_2$ or mixtures thereof.

It is generally preferred that the mean molar ratio Si/Al of the zeolite components according to the invention is from 5 to 100.

The above described catalyst composition according to the invention can be utilised as coating material or as coat on structured bodies of metallic, ceramic, metal oxide, SiC or silica materials or fibres.

Thus, the invention provides furthermore a monolithic structured body being coated with a catalyst composition according to anyone of the above disclosed embodiments of the invention.

The monolithic structured body is preferably made from metallic, ceramic, metal oxide, SiC or silica fiber materials.

The monolithic structured body may be in form of a particle filter, e.g. a honeycomb structured filter or a wall flow filter.

In further an embodiment, the catalyst composition is coated on the body in of two or several separate catalyst layers in series or as two or several catalyst layers in parallel and wherein the layers have different compositions or layer thicknesses.

Specific advantages resulting from the invention are

1) Addition of $CeO_2$—$ZrO_2$, $Cu/Al_2O_3$, $Mn/Al_2O_3$ or Ce—$Mn/Al_2O_3$ to acidic zeolite or zeotype in protonic form or promoted with iron markedly enhances $DeNO_x$ activity at $T_{react}$<250° C. without increasing amount of zeolite component. In this case, overall volume of the catalyst is increased by the volume of redox component added.

2) Alternatively, amount of expensive zeolite/zeotype component in the composite catalyst can be significantly reduced by its replacement with equivalent volume of redox component. In this case overall volume of the catalyst remains constant, but the amount of zeolite component can be decreased by 2-5 times, without notable sacrificing $DeNO_x$ performance. When Ce—$Mn/Al_2O_3$ component is used for the catalyst preparation, notable improvement of NOx conversion at $T_{react}$<250° C. is observed despite decreased amount of zeolite component.

3) In addition to favourable $DeNO_x$ activity, [$CeO_2$—$ZrO_2$+zeolites/zeotypes] or [Ce—$Mn/Al_2O_3$+zeolites/zeotypes] compositions demonstrate significant soot oxidation activity, which makes them promising candidates for development of integrated DeNOx-DeSoot catalytic systems.

4) In addition to favorable DeNO$_x$ activity, [CeO$_2$—ZrO$_2$+zeolites/zeotypes] or [Ce—Mn/Al$_2$O$_3$+zeolites/zeotypes] compositions demonstrate significantly lower ammonium slip at high temperature due to selective oxidation of excess ammonia.

The invention provides additionally a method for the selective reduction of nitrogen oxides and oxidation of soot contained in an off-gas comprising the step of contacting the off-gas in presence of ammonia with a catalyst composition comprising one or more acidic zeolite or zeotype components selected from the group consisting of BEA, MFI, FAU, FER, CHA, MOR or mixtures thereof physically admixed with one ore more redox active metal compounds selected from the group consisting of Cu/Al$_2$O$_3$, Mn/Al$_2$O$_3$, CeO$_2$—ZrO$_2$, Ce—Mn/Al$_2$O$_3$ and mixtures thereof.

The acidic zeolite or zeotype component can be used in protonic form or promoted with Fe In an embodiment of the inventive method, the one or more redox active metal compounds are dispersed on a support selected from the group consisting of Al$_2$O$_3$, TiO$_2$, SiO$_2$, ZrO$_2$ or mixtures thereof.

In still an embodiment of the inventive method, the catalyst composition is contacted with the off-gas at a temperature below 250° C.

In a further embodiment of the inventive method excess of ammonia is selectively oxidized to nitrogen by contact with the catalyst composition.

EXAMPLES

Example 1

Synergistic effect in NH$_3$-DeNOx over CeO2-ZrO2+H-Beta zeolite catalyst compositions.

[CeO$_2$—ZrO$_2$+H-Beta zeolite] composite catalyst was prepared by thorough mixing 74 wt % CeO$_2$-26 wt % ZrO$_2$ powder with H-Beta powder at a weight ratio of 10. This weight ratio results in volume ratio of components CeO$_2$—ZrO$_2$/H-Beta=3/1 due to difference in densities of these materials. The powders were thoroughly grinded in agate mortar for 10-15 min, followed by pelletization. The pellets were crushed and sieved collecting 0.2-0.4 mm fraction for catalytic test. Similarly pelletized 74 wt % CeO$_2$-26 wt % ZrO$_2$, H-Beta, and Fe-Beta zeolite were used as reference samples.

The catalysts were tested in the NH$_3$-DeNOx in the temperature range of 150-550° C. The test was performed under following conditions: decreasing reaction temperature with a rate of 2° C./min, feed gas composition: 500 ppm NO, 540 ppm NH$_3$, 10 vol % O$_2$, 6 vol % H$_2$O, balanced with N$_2$ to obtain a total flow of 300 mL/min.
Catalyst Loading and Resulted GHSV:
0.197 g with 74 wt % CeO$_2$—ZrO$_2$+0.02 g H-Beta zeolite, catalyst volume 0.134 ml, GHSV=135 000 h$^{-1}$ Under these conditions CeO$_2$—ZrO$_2$+H-Beta zeolite composite catalyst showed DeNO$_x$ activity, which substantially exceeded activities of individual 74 wt % CeO$_2$—ZrO$_2$ (0.131 g CeO$_2$—ZrO2, catalyst volume 0.067 ml, GHSV=270,000 h$^{-1}$) and H-Beta zeolite (0.04 g, catalyst volume 0.067 ml, GHSV=270 000 h-1), indicating pronounced synergistic effect between components of composite catalyst as shown in FIG. 1.

NO$_x$ conversion over composite catalyst is similar to NO$_x$ conversion over commercial Fe-Beta zeolite (Fe-Beta) at 230-550° C., and exceeds NO$_x$ conversion over Fe-Beta zeolite at 150-200° C.

Example 2

Enhanced DeNOx performance of [CeO$_2$—ZrO$_2$+Fe-Beta] composite catalyst at T$_{react}$<250° C.

Two samples of [CeO$_2$—ZrO$_2$+Fe-Beta zeolite] composite catalyst were prepared by thorough grinding of 74 wt % CeO$_2$—26 wt % ZrO$_2$ and Fe-Beta zeolite powders.

A first sample was prepared by mixing 74 wt % CeO$_2$-26 wt % ZrO$_2$ and Fe-Beta zeolite powders at a weight ratio of 3.3. This weight ratio results in a volume ratio of 74 wt % CeO$_2$—26 wt % ZrO$_2$/Fe-Beta components in composite catalyst=1/1. A second sample was prepared by mixing 74 wt % CeO$_2$-26 wt % ZrO$_2$ and Fe-Beta powders at a weight ratio of 10. For the second sample volume ratio of 74 wt % CeO$_2$-26 wt % ZrO$_2$/Fe-Beta zeolite equals 3/1.

After grinding in agate mortar for 10-15 min, the resulted mixtures were pelletized. The pellets were crushed and sieved collecting 0.2-0.4 mm fraction for catalytic test. Similarly pelletized Fe-Beta zeolite was used as reference.

Activities of the prepared samples were tested using the following catalyst loading which kept constant amount of Fe-Beta zeolite component in the reactor:

The first sample with 1/1 volume component ratio: [0.065 g 74% CeO$_2$—ZrO$_2$+0.02 g Fe-Beta zeolite].

The second sample with 3/1 volume component ratio: [0.197 g 74% CeO$_2$—ZrO$_2$+0.02 g Fe-Beta zeolite].

Reference sample: 0.02 g Fe-Beta zeolite.

The catalysts were tested in NH$_3$-DeNO$_x$ within the temperature range of 150-550° C. The test was performed under following conditions: decreasing reaction temperature with a rate of 2° C./min, feed gas composition: 500 ppm NO, 540 ppm NH$_3$, 10 vol % O$_2$, 6 vol % H$_2$O, balanced with N$_2$ to obtain a total flow of 300 mL/min.
Catalyst Loading and Resulted GHSV:
[0.197 g 74% CeO$_2$—ZrO2+0.02 g Fe-Beta zeolite], catalyst vol.=0.134 ml, GHSV=135 000 h$^{-1}$;
[0.065 g 74% CeO$_2$—ZrO2+0.02 g Fe-Beta zeolite], catalyst vol.=0.067 ml, GHSV=270 000 h$^{-1}$;
0.02 Fe-Beta zeolite, catalyst vol.=0.034 ml, GHSV=540 000 h$^{-1}$.

Figure 2:
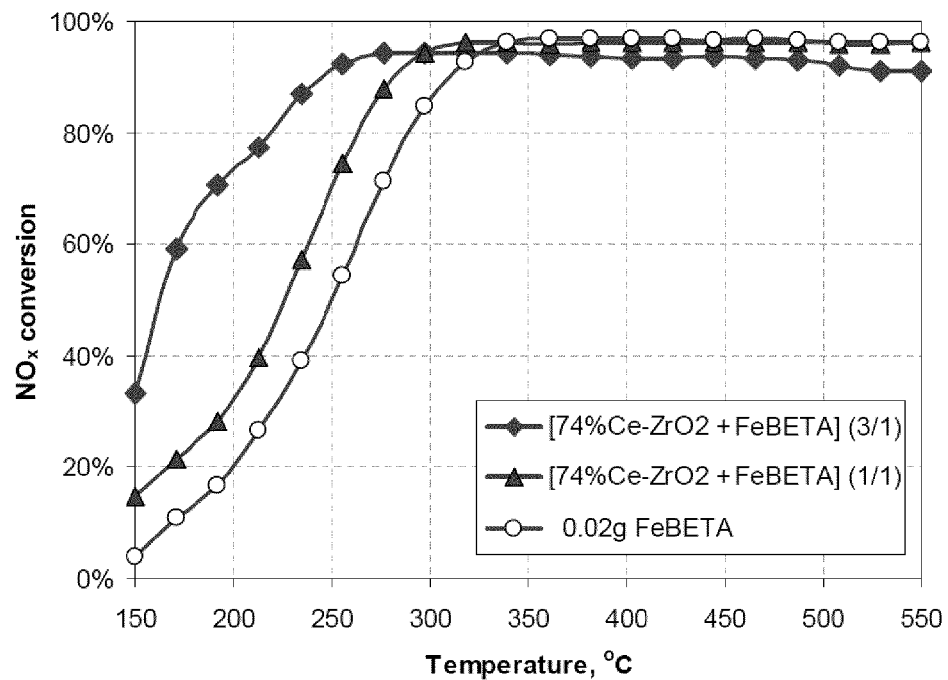
FIG. 2 is a graph illustrating enhanced $DeNO_x$ activity within low-temperature range of $CeO_2$—$ZrO_2$+Fe-Beta zeolite composite catalysts, which significantly exceed activity of individual Fe-Beta zeolite.

Under these test conditions [CeO$_2$—ZrO$_2$+Fe-Beta zeolite] composite catalysts showed enhanced DeNO$_x$ activity within low-temperature range (150-300° C.), which significantly exceeded activity of individual Fe-Beta zeolite, as shown in FIG. 2. It is important to note that the activity of [CeO$_2$—ZrO$_2$+Fe-Beta zeolite] is improved when the amount of CeO$_2$—ZrO$_2$ component was increased.

Example 3

Catalyst with reduced amount of zeolite component.

Three samples of [CeO$_2$—ZrO$_2$+Fe-Beta zeolite] composite catalyst were prepared by thorough grinding of 74 wt % CeO$_2$—26 wt % ZrO$_2$ powder with Fe-Beta zeolite powder:

A first sample was prepared by mixing 74 wt % CeO$_2$-26 wt % ZrO$_2$ and Fe-Beta powders at a weight ratio of 3.3. In this case volume ratio of 74 wt % CeO$_2$-26 wt % ZrO$_2$/Fe-Beta zeolite equals 1/1.

A second sample was prepared by mixing 74 wt % CeO$_2$-26 wt % ZrO$_2$ and Fe-Beta zeolite powders at a weight ratio of 15.5. For the second sample volume ratio of 74 wt % CeO$_2$-26 wt % ZrO$_2$ and Fe-Beta zeolite components equals 5/1.

A third sample was prepared by was prepared by mixing 74 wt % CeO$_2$-26 wt % ZrO$_2$ and Fe-Beta zeolite powders at a weight ratio of 30. For the second sample volume ratio of 74 wt % CeO$_2$-26 wt % ZrO$_2$ and Fe-Beta zeolite components equals 10/1.

After grinding in agate mortar for 10-15 min, the resulted mixtures were pelletized. The pellets were crushed and sieved collecting 0.2-0.4 mm fraction for catalytic test. Similarly pelletized Fe-Beta zeolite was used as reference.

Activities of the prepared samples were tested using the following catalyst loading which kept constant volume of the catalyst in the reactor. In all experiments described below overall volume on the catalyst loaded was 0.067 ml, which results in GHSW~270 000 $h^{-1}$:

First sample (1/1 vol component ratio): [0.065 g 74 wt % $CeO_2$—$ZrO_2$+0.02 g Fe-Beta zeolite].

Second sample (5/1 vol component ratio): [0.109 g 74 wt % $CeO_2$—$ZrO_2$+0.007 g Fe-Beta zeolite].

Third sample (10/1 vol component ratio): [0.119 g 74 wt % $CeO_2$—$ZrO_2$+0.0035 g Fe-Beta zeolite].

Reference sample: 0.02 g Fe beta-zeolite.

Feed gas composition: 540 ppm $NH_3$, 500 ppm NO, 10% $O_2$, 6% $H_2O$ balance with $N_2$.

Under these conditions [$CeO_2$—$ZrO_2$+Fe-Beta zeolite] composite catalysts showed $DeNO_x$ performances, which were essentially identical to the performance of reference Fe-Beta zeolite sample, despite significantly reduced amount of zeolite catalyst (Fe-Beta zeolite) loaded into the reactor as a part of composite [$CeO_2$—$ZrO_2$+Fe-Beta zeolite].

Figure 3:
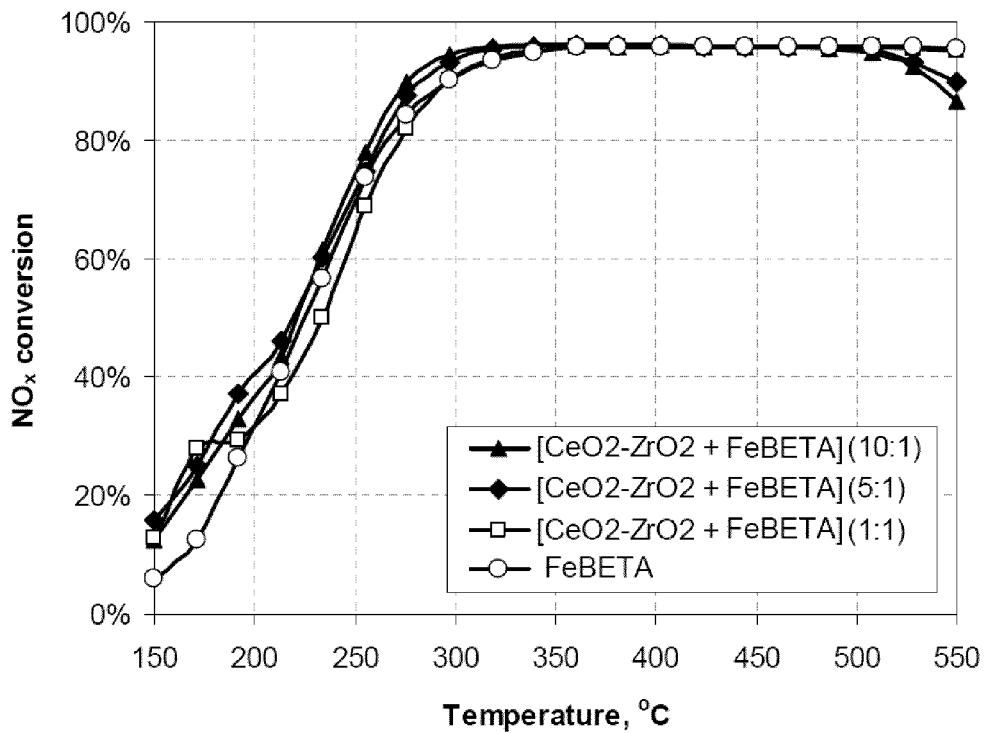
FIG. 3 is a graph illustrating that amount of zeolite can be reduced at least 10 times without sacrificing $DeNO_x$ performance of [$CeO_2$—$ZrO_2$+Fe-Beta zeolite] by its replacement with corresponding volume of $CeO_2$—$ZrO_2$.

The data in FIG. 3 show that amount of zeolite can be reduced at least 10 times without sacrificing $DeNO_x$ performance of [$CeO_2$—$ZrO_2$+Fe-Beta zeolite] by its replacement with corresponding volume of $CeO_2$—$ZrO_2$.

Example 4

Enhanced $DeNO_x$ performance of [Ce—Mn/$Al_2O_3$+Fe-Beta zeolite] composite catalyst at $T_{react}$<250° C.

[Ce—Mn/$Al_2O_3$+Fe-Beta] composite catalysts were prepared by thorough mixing 15 wt % Ce-15 wt % Mn/$Al_2O_3$ powder with Fe-Beta powder at a weight ratio of 0.8:1; 1.7:1 and 3.4:1 keeping the same total volume of the catalyst constant. These weight ratios result in volume ratio of components Ce—Mn/$Al_2O_3$/Fe-Beta=2/1; 1/1 and 1/2 due to difference in densities of these materials. The powders were thoroughly grinded in agate mortar for 10-15 min, followed by pelletization. The pellets were crushed and sieved collecting 0.2-0.4 mm fraction for catalytic test. Similarly pelletized Fe-Beta was used as reference.

The catalysts were tested in the $NH_3$-DeNOx in the temperature range of 150-550° C. The test was performed under following conditions: decreasing reaction temperature with a rate of 2° C./min, feed gas composition: 500 ppm NO, 540 ppm $NH_3$, 10 vol % $O_2$, 6 vol % $H_2O$, balanced with $N_2$ to obtain a total flow of 300 mL/min.

Catalyst Load:

0.04 g Fe-Beta and [0.045 g Ce—Mn/$Al_2O_3$+0.013 g Fe-Beta] (2/1 ratio), [0.034 g Ce—Mn/$Al_2O_3$+0.02 g Fe-Beta] (1/1 ratio), [0.022 g Ce—Mn/$Al_2O_3$+0.027 g Fe-Beta] (1/2 ratio).

Figure 4:
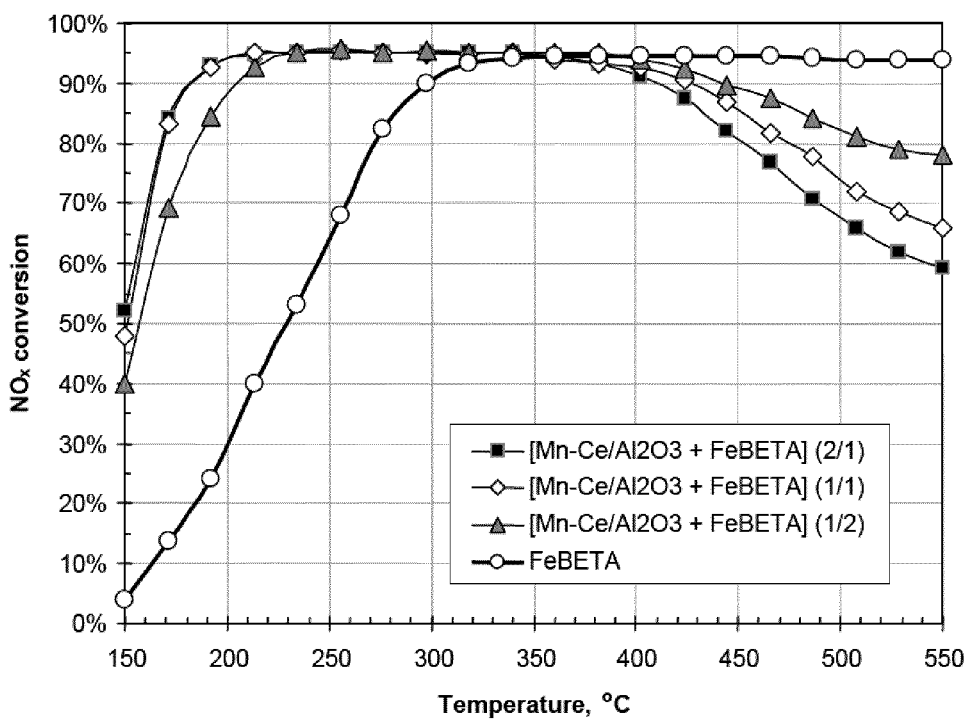
FIG. 4 is a graph illustrating that all [Ce—$Mn/Al_2O_3$+Fe-Beta] composite catalysts showed $DeNO_x$ activity, which exceed activities of individual Ce—$Mn/Al_2O_3$ and Fe-Beta at temperatures below 350° C.

Under these conditions all [Ce—Mn/$Al_2O_3$+Fe-Beta] composite catalysts showed $DeNO_x$ activity, which radically exceeded activities of individual Ce—Mn/$Al_2O_3$ and Fe-Beta at temperatures below 350° C., indicating pronounced synergistic effect between components of composite catalyst (FIG. 4). Besides that, ammonia slip on composite catalysts was significantly lower than for a reference Fe-Beta catalyst indicating that those composite systems can be used as integrated DeNOx-ASC.

Example 5

Enhanced DeNOx performance of [10 wt % Cu/$Al_2O_3$+H-zeolite] composite catalysts.

Three samples of [10 wt % Cu/$Al_2O_3$+H-zeolite] composite catalyst were prepared by thorough grinding of 10 wt % Cu/$Al_2O_3$ and H-Beta, H-ZSM-5, or H-ferrierite powder.

A first sample was prepared by mixing 10 wt % Cu/$Al_2O_3$ and H-Beta (Si/Al=20) powders at a weight ratio of 1/1.

A second sample was prepared by mixing 10 wt % Cu/$Al_2O_3$ and H-ZSM-5 powders (Si/Al=20) at a weight ratio of 1/1.

A third sample was prepared by mixing 10 wt % Cu/$Al_2O_3$ and H-ferrierite powders (Si/Al=32) at a weight ratio of 1/1.

After grinding in agate mortar for 10-15 min, the resulted mixtures were pelletized. The pellets were crushed and sieved collecting 0.2-0.4 mm fraction for catalytic test.

Similarly corresponding pelletized zeolites (H-Beta, H-ZSM-5, and H-ferrierite) were used as reference.

Activities of the prepared samples were tested using the following catalyst loading which kept constant amount of zeolite component in the reactor:

The first sample with 1/1 weight component ratio: [0.040 g 10 wt % Cu/$Al_2O_3$+0.040 g H-Beta].

The second sample with 1/1 weight component ratio: [0.040 g 10 wt % Cu/$Al_2O_3$+0.040 g H-ZSM-5].

The third sample with 1/1 weight component ratio: [0.040 g 10 wt % Cu/$Al_2O_3$+0.040 g H-ferrierite].

Reference samples: 0.040 g H-Beta; 0.040 g H-ZSM-5, or H-ferrierite, or 0.040 g 10 wt % Cu/$Al_2O_3$.

The catalysts were tested in $NH_3$-$DeNO_x$ within the temperature range of 150-550° C. The test was performed under following conditions: decreasing reaction temperature with a rate of 2° C./min, feed gas composition: 500 ppm NO, 540 ppm $NH_3$, 10 vol % $O_2$, 6 vol % $H_2O$, balanced with $N_2$ to obtain a total flow of 300 mL/min.

Catalyst Loading and Resulted GHSV:

[0.040 g 10 wt % Cu/$Al_2O_3$+0.040 g H-Beta], catalyst vol.=0.134 ml, GHSV=135 000 $h^{-1}$;

[0.040 g 10 wt % Cu/$Al_2O_3$+0.040 g H-ZSM-5], catalyst vol.=0.134 ml, GHSV=135 000 $h^{-1}$;

[0.040 g 10 wt % Cu/$Al_2O_3$+0.040 g H-ferrierite], catalyst vol.=0.134 ml, GHSV=135 000 $h^{-1}$;

Reference Catalysts 0.040 g H-Beta, catalyst vol.=0.067 ml, GHSV=270,000 $h^{-1}$;

0.040 g H-ZSM-5, catalyst vol.=0.067 ml, GHSV=270,000 $h^{-1}$;

0.040 g H-ferrierite, catalyst vol.=0.067 ml, GHSV=270,000 $h^{-1}$;

0.040 g Cu/$Al_2O_3$, catalyst vol.=0.067 ml, GHSV=270,000 $h^{-1}$.

Figure 5:
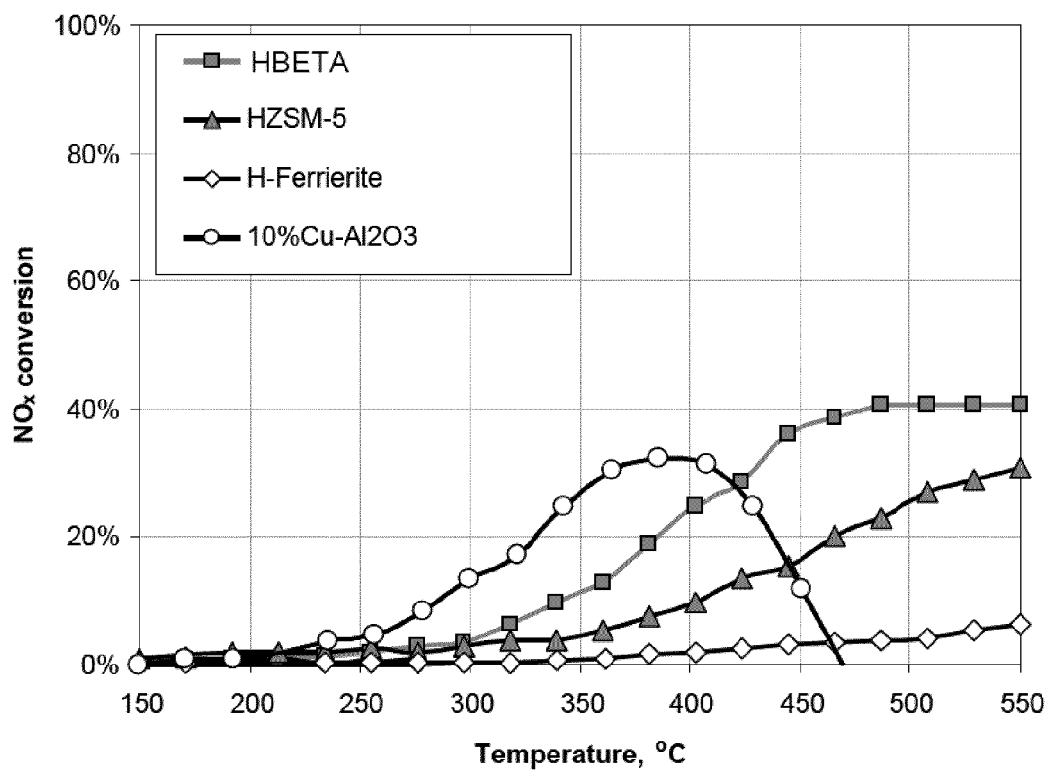
FIGS. 5 and 6 are graphs illustrating that [10 wt % $Cu/Al_2O_3$+H-zeolite] composite catalysts showed enhanced $DeNO_x$ within the whole temperature range (150-550° C.) (FIG. 6) relative to the activity of individual components (FIG. 5).
Figure 6:
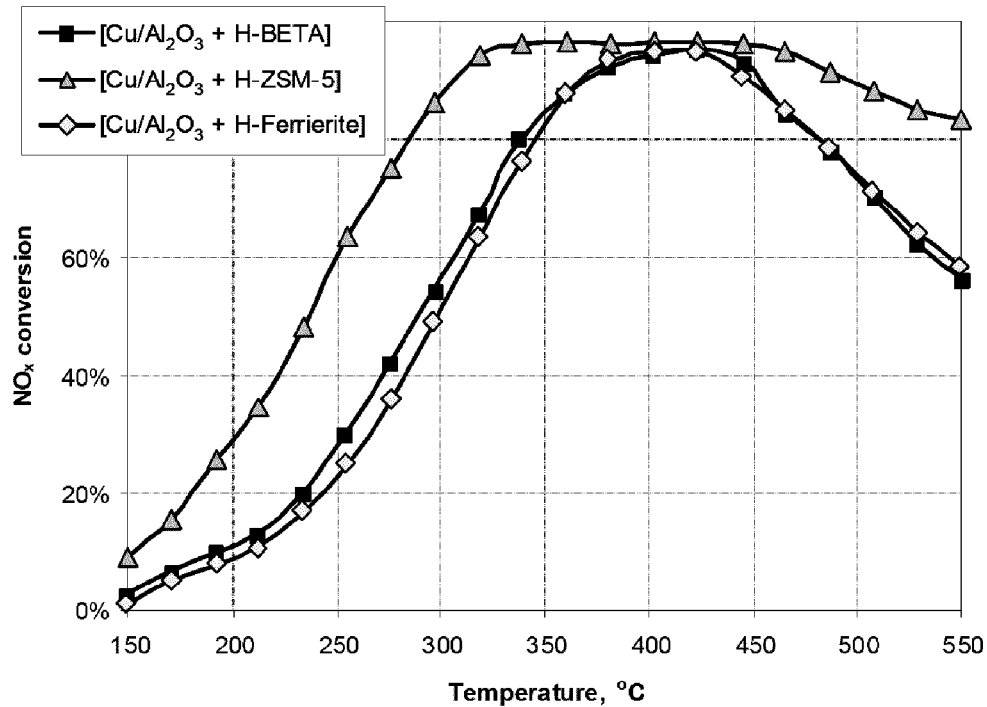

Under these test conditions [10 wt % Cu/$Al_2O_3$+H-zeolite] composite catalysts showed enhanced $DeNO_x$ within the whole temperature range (150-550° C.), which significantly exceeded activity of individual components, as shown by comparing FIG. 5 and FIG. 6.

Example 6

Catalyst with enhanced soot oxidation activity.

[$CeO_2$—$ZrO_2$+Fe-Beta] with 3/1 vol. component ratio was prepared as described in Example 2. For testing soot oxidation activity of [$CeO_2$—$ZrO_2$+Fe-Beta] a part of pelletized sample was crushed, and the catalyst powder was mixed with soot ("Printex U", Degussa) at a weight ratio catalyst/soot=1/10. Soot and catalyst were mixed by shaking in a glass bottle for 5 min, thus establishing loose contact between soot and the catalyst. Reference sample was prepared in a similar manner using Fe-Beta powder.

Figure 7:
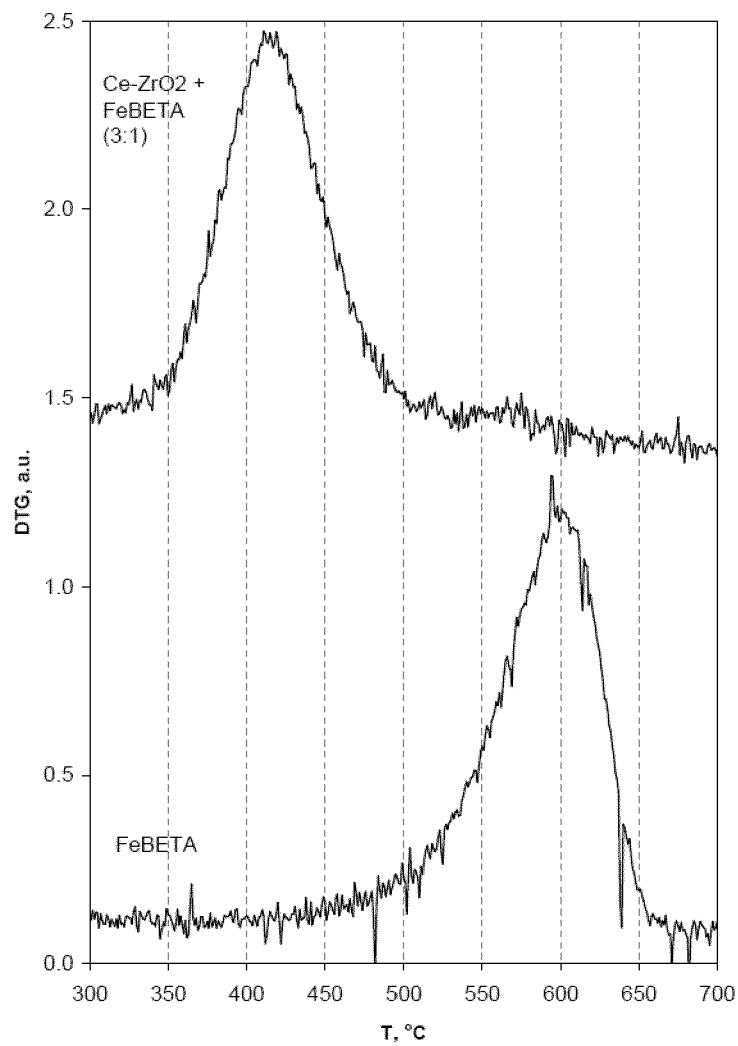
FIG. 7 is a graph illustrating that [$CeO_2$—$ZrO_2$+Fe-Beta] composite catalyst has significantly higher activity in soot oxidation than individual Fe-Beta.

Soot oxidation was carried out at temperature ramp=10° C./min in a flow of dried air. Profiles of soot oxidation over [$CeO_2$—$ZrO_2$+Fe-Beta] and Fe-Beta are displayed in FIG. 7. [$CeO_2$—$ZrO_2$+Fe-Beta] significantly higher activity in soot oxidation then individual Fe-Beta, as evidenced by a shift of soot oxidation maximum from ~600° C. for (Fe-Beta+soot) to ~420° C. for ([$CeO_2$—$ZrO_2$+Fe-Beta]+soot).

The invention claimed is:

1. Catalyst composition for selective reduction of nitrogen oxides and soot oxidation comprising of one or more acidic zeolite or zeotype components selected from the group consisting of BEA, MFI, FAU, FER, CHA, MOR or mixtures thereof physically admixed with one ore more redox active metal compounds selected from the group consisting of $CU/Al_2O_3$, $Mn/Al_2O_3$, $CeO_2$-$ZrO_2$, Ce—$Mn/Al_2O_3$ and mixtures thereof.

2. The catalyst composition of claim 1, wherein weight ratio between the zeolite components and the redox components is between 1:1 and 1:50.

3. The catalyst composition of claim 1, wherein the one or more redox active metal compounds are dispersed on a support selected from the group consisting of $Al_2O_3$, $TiO_2$, $SiO_2$, $ZrO_2$ or mixtures thereof.

4. The catalyst composition according to claim 1, wherein the one or more acidic zeolite or zeotype components are in protonic form or promoted with Fe.

5. The catalyst composition according to claim 1, wherein mean molar ratio of Si/Al of the one or more acidic zeolite or zeotype components is from 5 to 100.

6. The catalyst composition according to claim 1, wherein the one or more acidic zeolite or zeotype components are selected from the group consisting of beta-zeolite, ZSM-5 and ferrierite.

7. A monolithic structured body being coated with a catalyst composition according to claim 1.

8. The monolithic structured body of claim 7, wherein the monolithic structured body is in a form of a particle filter.

9. The monolithic structured body of claim 7, wherein the catalyst composition is coated on the body in two or several separate catalyst layers in series or as two or several catalyst layers in parallel and wherein the layers have different compositions or layer thicknesses.

10. Method for the selective reduction of nitrogen oxides and oxidation of soot contained in an off-gas comprising the step of contacting the off-gas in presence of ammonia with a catalyst composition comprising one or more acidic zeolite or zeotype components selected from the group consisting of BEA, MFI, FAU, FER, CHA, MOR or mixtures thereof physically admixed with one ore more redox active metal compounds selected from the group consisting of $CU/Al_2O_3$, $Mn/Al_2O_3$, $CeO_2$—$ZrO_2$, Ce—$Mn/Al_2O_3$ and mixtures thereof.

11. The method according claim 10, wherein the one or more redox active metal components dispersed on the surface of the one or more zeolite components contain Ce, Mn, Zr, Cr or mixtures thereof.

12. The method of according to claim 10, wherein the catalyst composition is contacted with the off-gas at a temperature below 250° C.

13. The method according to claim 10, wherein excess of ammonia is selectively oxidized to nitrogen by contact with the catalyst composition.

14. The method according to claim 10, wherein the one or more acidic zeolite or zeotype components are in protonic form or promoted with Fe.

15. The method according to claim 10, wherein mean molar ratio of Si/Al of the one or more acidic zeolite or zeotype components is from 5 to 100.

16. The method according to claim 10, wherein the one or more acidic zeolite or zeotype components are selected from the group consisting of beta-zeolite, ZSM-5 and ferrierite.

* * * * *